United States Patent
Sicart et al.

(10) Patent No.: US 8,103,255 B2
(45) Date of Patent: Jan. 24, 2012

(54) METHOD AND A DEVICE FOR ASSOCIATING A TERMINAL WITH A USER ACCOUNT

(75) Inventors: Julien Sicart, Paris (FR); Denis Prouvost, Paris (FR)

(73) Assignee: France Telecom, Paris (FR)

( * ) Notice: Subject to any disclaimer, the term of this patent is extended or adjusted under 35 U.S.C. 154(b) by 994 days.

(21) Appl. No.: 11/818,273

(22) Filed: Jun. 13, 2007

(65) Prior Publication Data

US 2008/0045187 A1   Feb. 21, 2008

(30) Foreign Application Priority Data

Jun. 13, 2006   (FR) ..................................... 06 52102

(51) Int. Cl.
*H04M 3/42* (2006.01)
(52) U.S. Cl. .................. 455/414.1; 455/435.1; 455/411; 370/230; 370/236.2; 370/241.1; 370/395.2

(58) Field of Classification Search ............... 455/414.1, 455/435.1, 411; 370/230, 236.2, 241.1, 385.2
See application file for complete search history.

(56) References Cited

U.S. PATENT DOCUMENTS

| | | | |
|---|---|---|---|
| 7,269,728 B1 * | 9/2007 | Li | 713/163 |
| 7,738,424 B2 * | 6/2010 | Ng et al. | 370/331 |
| 2005/0021766 A1 | 1/2005 | McKeowen et al. | |
| 2005/0239445 A1 | 10/2005 | Karaoguz et al. | |
| 2006/0101143 A1 * | 5/2006 | Garcia et al. | 709/225 |

* cited by examiner

*Primary Examiner* — Nimesh Patel
(74) *Attorney, Agent, or Firm* — Cozen O'Connor

(57) ABSTRACT

The association device obtained from an association request issued by a terminal both an identifier of said terminal and the address of a gateway via which the terminal is connected to the network. The device also obtains a second gateway address from the source address of an access request issued by another terminal for making a connection to the user account. The terminal and the user account are associated when the two gateway addresses are equal.

9 Claims, 3 Drawing Sheets

METHOD AND A DEVICE FOR ASSOCIATING A TERMINAL WITH A USER ACCOUNT

BACKGROUND OF THE INVENTION

The field of the invention is that of telecommunications networks, and more particularly but not exclusively, networks for home use.

More precisely, consideration is given to a user seeking to use a terminal to access a service platform available on the network.

The field of the invention is limited to applications in which the terminal is connected to the telecommunications network via a gateway.

In the meaning of this document, a gateway is a device suitable for interconnecting a local network and an operator network, e.g. of the Internet protocol (IP) type, via an access network operating on a wire or a wireless medium.

Such a gateway is suitable in particular for performing address translation between its own address and the addresses of the terminals of the local network in the data frames that are exchanged between the two networks.

This is also referred to as "address substitution".

In numerous applications, it is advantageous to associate an identifier of the terminal with an account of the user on the service platform.

By way of example, such an association makes it possible to personalize the man/machine interface of the terminal as a function of choices made by the user.

Such an association also makes it possible to encourage e-commerce applications in which the terminal is used for selecting articles or for gaining access to services, with payment for said articles or services being billed to the user whose account is associated with the terminal.

In the present state of the art, when a user seeks to associate a terminal with that user's account on a service platform, the user must make a connection via a web interface with the service platform and manually input a unique identifier of the terminal, e.g. a serial number.

Such manipulation is complex and runs the risk of inputting mistakes.

Another solution used in the present state of the art for associating a terminal with a user account on a service platform consists in recording the identifier of the terminal and the identifier of the user account at the time the terminal is ordered or delivered. By way of example, such an operation can be performed by the telecommunications operator.

That solution is complex for the operator to manage and cannot be implemented when the terminal is sold by a third party, e.g. directly by its manufacturer.

OBJECT AND SUMMARY OF THE INVENTION

The present invention proposes a method of associating a terminal with a user account on a service platform, without requiring input from the user.

In a first aspect, the invention provides an association method for associating the unique identifier of a first terminal connected to a telecommunications network via a gateway with the unique identifier of an account of a user of said terminal, the address of said gateway in the network being referred to as the "first gateway address".

This method comprises:

a step of receiving an access request, issued by a second terminal for connecting to the user account, the source address contained in the access request possibly being substituted by the gateway;

a step of obtaining the above-mentioned source address and account identifier from the access request;

a step of receiving an association request issued by the first terminal;

a step of obtaining the first gateway address and the identifier of the first terminal from the association request;

a step of obtaining a second gateway address from the source address; and a step of comparing the first and second gateway addresses, and if the addresses are equal:

a step of associating the unique identifier of the first terminal with the unique account identifier in the database.

The invention correspondingly also provides a device for associating the unique identifier of a first terminal connected to a telecommunications network via a gateway with the unique identifier of an account of a user of said terminal, the address of said gateway in the network being referred to as the "first gateway address".

The device comprises:

receiver means for receiving an access request issued by a second terminal for making a connection to the user account, the source address contained in the access request possibly being substituted by the gateway;

means for obtaining the above-mentioned source address and account identifier from the access request;

receiver means for receiving an association request issued by the first terminal;

means for obtaining the first gateway address and the identifier of the first terminal from the association request;

means for obtaining a second gateway address from the source address;

means for comparing the first and second gateway addresses; and means for associating, if the addresses are equal, the unique identifier of the first terminal with the unique account identifier in a database.

In a first embodiment, it is assumed that the user is connected on the service platform to that user's account by means of a second terminal.

In accordance with the invention, in this first embodiment, the service platform is adapted to obtain the address of a residential gateway associated with the user account, with such an association generally being performed by the operator when making the connection between the gateway and the network.

In this first embodiment, the association method and the device of the invention verify that the address of the gateway on the network corresponds to the address of the gateway behind which the terminal for association is connected, and make the association when that is true.

The unique identifier of the first terminal is thus associated with the account of the user without the identifier being input.

In one particular configuration, the first and second terminals are both connected to the network via the same gateway. Under such circumstances, the address of the gateway is contained in the access request, given that the gateway always substitutes its own address for the addresses of the home terminals that are connected thereto in conventional manner for all requests issued to the network.

The invention also applies when the second terminal is not connected to the network via the gateway to which the first terminal is connected.

Under such circumstances, in accordance with the invention, the address of the gateway is obtained from a database that associates the account identifier with said address. This database is generally managed by the operator.

In a particular implementation of the invention, the second gateway address is obtained in two substeps, namely:

obtaining an identifier of a telecommunications line associated with the unique user account identifier; and obtaining the second gateway address associated with the line identifier.

When the gateway is connected to the Internet by an ADSL line, the above-mentioned line identifier may correspond to the identifier of the ADSL line.

In a second aspect, the invention provides a method of associating the unique identifier of a terminal connected to the telecommunications network via a gateway with the unique identifier of an account of a user of said terminal.

The method comprises:

a step of receiving an association request issued by the terminal;

a step of obtaining the gateway address in the network and an identifier of the terminal from the association request;

a step of obtaining at least one user account identifier associated with gateway address in the database;

a step of sending said account identifier(s) to the terminal;

a step of receiving a response from the terminal that includes only one of the account identifiers; and a step of associating said account identifier with the terminal identifier.

Correspondingly, the invention also provides a device for associating the unique identifier of a terminal connected to a telecommunications network via a gateway with the unique identifier of an account of a user of the terminal.

The device comprises:

receiver means for receiving an association request issued by the terminal;

means for obtaining the address of the gateway in the network and an identifier of the terminal from the association request;

means for obtaining at least one user account identifier associated with the gateway address in the database;

means for sending said account identifier(s) to the terminal;

receiver means for receiving a response from the terminal that includes only one of the account identifiers; and means for associating said account identifier with the terminal identifier.

In this second embodiment, the user need not necessarily be connected to the account via a second terminal.

In this embodiment, the service platform obtains the list of user accounts associated with the address of the gateway behind which the terminal for association is connected.

This list is then proposed to the user via the interface of the first terminal, e.g. by being displayed on a screen of the terminal.

The user can then select the account with which the terminal is to be associated, e.g. by means of a pointer.

This likewise avoids any error in inputting the identifier of the terminal.

In a particular embodiment of the invention, the identifier of the user account is obtained in two substeps, namely:

obtaining an identifier of a telecommunications line associated with the address of the gateway; and obtaining at least one user account identifier associated with the line identifier.

When the gateway is connected to the Internet by an ADSL line, the above-mentioned line identifier may correspond to the identifier of said ADSL line.

In a particular embodiment, the various steps of the association method are determined by instructions of computer programs.

Consequently, the invention also provides a computer program carried by a data medium, the program being suitable for being implemented in an association device, or more generally in a computer, said program including instructions adapted to implement steps of an association method as described above.

The program may use any programming language, and it may be in the form of source code, object code, or code that is intermediate between source code and object code, such as in a partially-compiled form, or in any other desirable form.

The invention also relates to a computer medium that is readable by a computer, and that includes instructions of a computer program as mentioned above.

The data medium may be any entity or device capable of storing the program. For example, the medium may comprise storage means such as read-only memory (ROM), e.g. a CD ROM or a microelectronic circuit ROM, or indeed magnetic recording means, e.g. a floppy disk or a hard disk.

Furthermore, the data medium may be a transmission medium such as an electrical or optical signal, which may be conveyed via an electrical or optical cable, by radio, or by other means. The program of the invention may in particular be downloaded from an Internet type network.

Alternatively, the data medium may be an integrated circuit in which the program is incorporated, the circuit being adapted to execute the method in question, or to be used in the execution thereof.

BRIEF DESCRIPTION OF THE DRAWINGS

Other characteristics and advantages of the present invention appear from the following description made with reference to the accompanying drawings that show an embodiment without any limiting character. In the figures.

DETAILED DESCRIPTION OF A FIRST
EMBODIMENT IN A FIRST ENVIRONMENT

Figure 1:
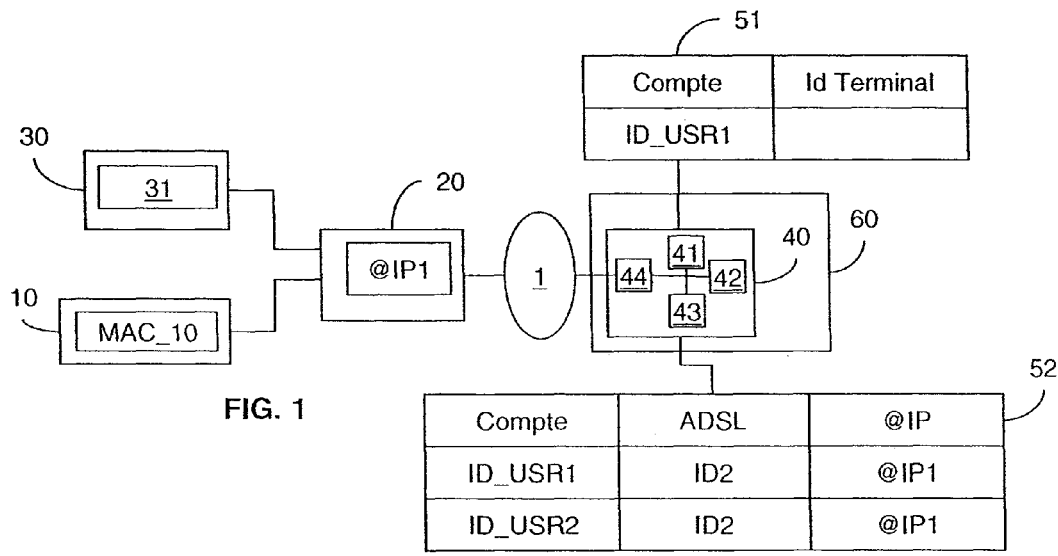
FIG. 1 shows an association device in accordance with the invention, in a first environment.

FIG. 1 shows an association device 40 in accordance with the invention, implemented in a service platform 60.

The device 40 has the hardware architecture of a conventional computer. In particular, it comprises a processor 41, a read/write memory 42 of the random access memory (RAM) type, and a read-only memory 43 having recorded therein a computer program in accordance with the invention, the program including instructions for executing the steps of the method represented by the flow chart shown in FIG. 3.

The association device 40 in accordance with the invention is connected to the Internet 1 by communications means 44 constituted specifically by a network card and by associated software drivers.

FIG. 1 shows two terminals referenced 10 and 30 that are connected to the Internet 1 via a gateway 20, which in this example is of the residential type.

In this example, the gateway 20 is connected to the Internet 1 via an ADSL line having an ADSL identifier referenced ID2.

In the example described herein, the terminal referenced 30 is a personal computer. It includes a browser 31 enabling the user to browse the Internet 1.

In this example it is assumed that the user possesses an account on the service platform 60, with the unique identifier of the account being referenced ID_USR1.

By way of example, this unique account identifier ID_USR1 may be constituted by an email address of the type p.dupont@orange.fr.

The terminal 10 possesses a unique identifier. In this example that is constituted by its MAC address MAC_10.

It is assumed below that the user seeks to associate the unique identifier MAC_10 of the terminal 10 in a database 51 that is accessible via the association device 40 with the unique identifier ID_USR1 of the user's account on the service platform 60.

As can be seen in FIG. 1, prior to implementing the invention, the database 51 does not have any terminal identifier associated with the account having the identifier ID_USR1.

Figure 3:
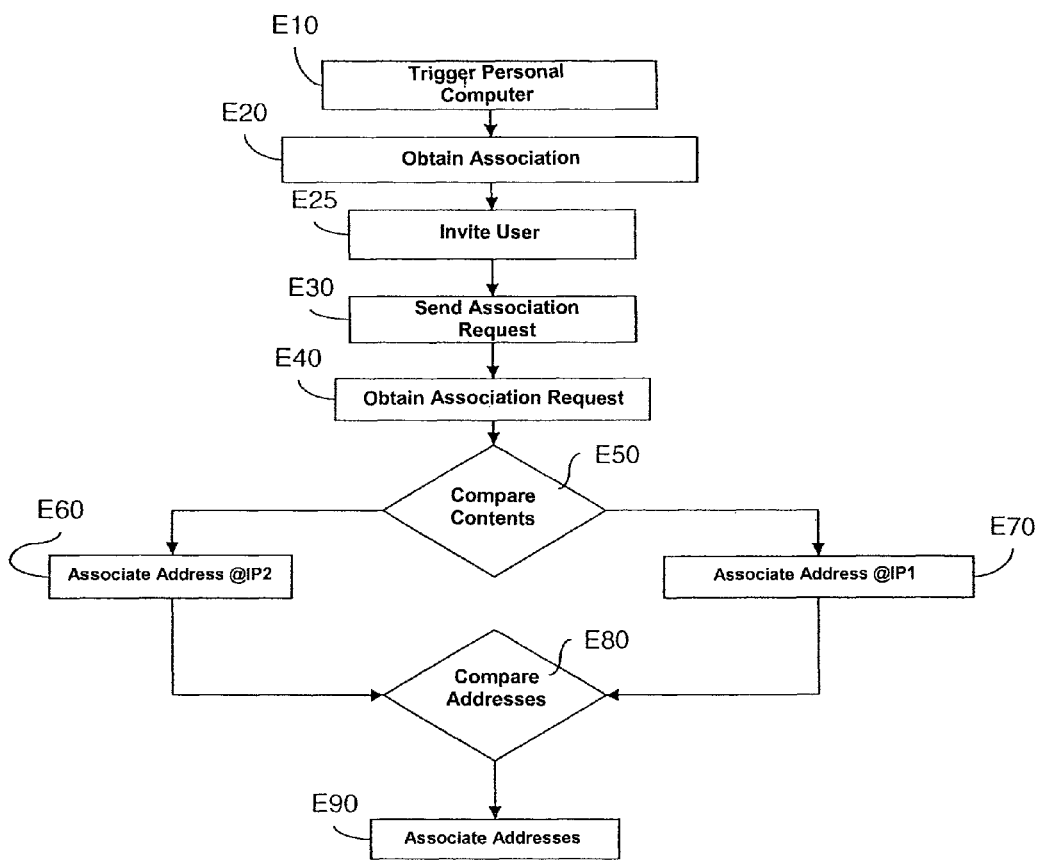
FIG. 3 is in the form of a flow chart showing the main steps in an association method in a first implementation that applies to both of these environments.

With reference to FIG. 3, there follows a description of the main steps of the association method implemented by the device 40.

During a step E10, the user of the personal computer 30 performs an operation that triggers the personal computer 30 sending a request R1 seeking access to the user account of identifier ID_USR1 that is stored in the database 51.

On being issued, the source address @S contained in access request R1 is the address @IP_30 of the computer 30.

This request R1 is relayed by the gateway 20 positioned in the data flow between the personal computer 30 and the Internet.

In conventional manner, the gateway 20 makes an address substitution.

After being relayed by the gateway 20, the source address of the access request R1 is thus the address @IP1 of the gateway.

It is assumed that this access request R1 is received by the association device 40 in accordance with the invention during the same step E10.

Figure 6:
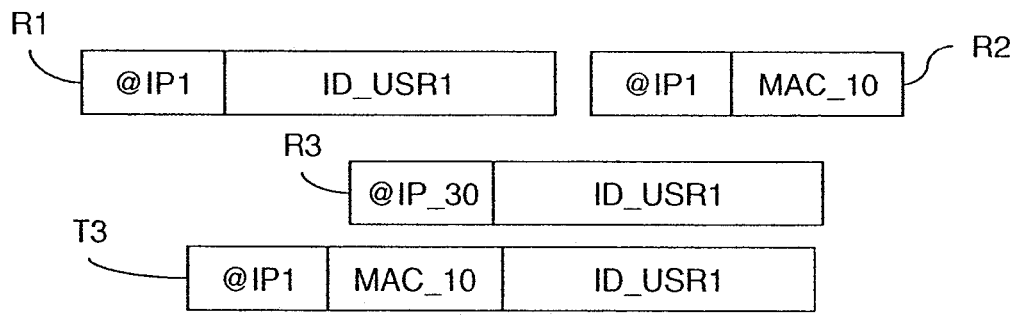
FIG. 6 shows the requests that can be used in the invention.

This access request R1 as received by the gateway 20 is shown in FIG. 6.

It is assumed that this access request R1 also includes the unique identifier ID_USR1 of the account of the user on the service platform 60.

During a step E20, the association device 40 in accordance with the invention obtained from said access request R1:
 the source address @S of the access request R1, and stores it in a first variable V1 in its read/write memory 42; and
 the account identifier ID_USR1.

Then, during a test that does not have a reference numeral, the association device 40 verifies whether a terminal identifier is associated with the account of identifier ID_USR1 in the database 51.

Since this is not so, this test is followed by a step E25 during which the association device 40 invites the user to perform an operation on the terminal 10.

In the example described herein, this operation consists in pressing on a specific button of the terminal 10.

After this button has been pressed, the terminal 10 acts during a step E30 to send an association request R2 to the association device 40.

This association request R2 is shown in FIG. 6.

It comprises the identifier MAC_10 of the terminal 10 together with the address @IP1 of the gateway 20, which gateway is placed in the data flow between the terminal 10 and the Internet 1.

It is assumed that this association request R2 is received by the association device 40 during the same step E30.

During a step E40, the association device 40 obtains from the association request R2:
 the identifier MAC_10 of the terminal 10 for association; and
 the address @IP1 contained in said request. It stores this address in a variable V2 in the read/write memory 42.

During a test E50, the processor 41 of the association device 40 compares the contents of the variables V1 (source address R1) and V2 (address of the association request R2) and it detects that these values are equal.

The result of the test E50 is thus positive. It is followed by a step E60 during which the processor 41 of the association device 40 allocates the source address of the access request R1 obtained in step E20 to a second gateway address @IP2.

This allocation step E60 is followed by a test E80 during which the processor 41 of the association device 40 compares the first and second gateway addresses @IP1 and @IP2 and detects that these values are equal.

The result of the test E80 is positive.

It is followed by a step E90 during which the association device 40 associates, in the database 51, the unique identifier MAC_10 of the terminal 10 obtained in the association request R2 with the unique account identifier ID_USR1 obtained in the access request R1.

Figure 7:
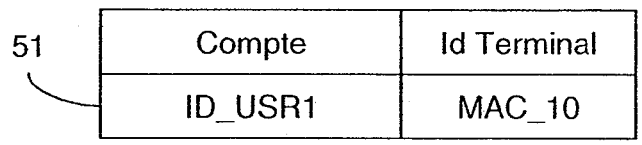
FIG. 7 shows a database of a service platform after implementing the invention in either of its two embodiments.

FIG. 7 shows the state of the database 51 after this association step E90.

Detailed Description of the First Embodiment in a Second Environment

Figure 2:
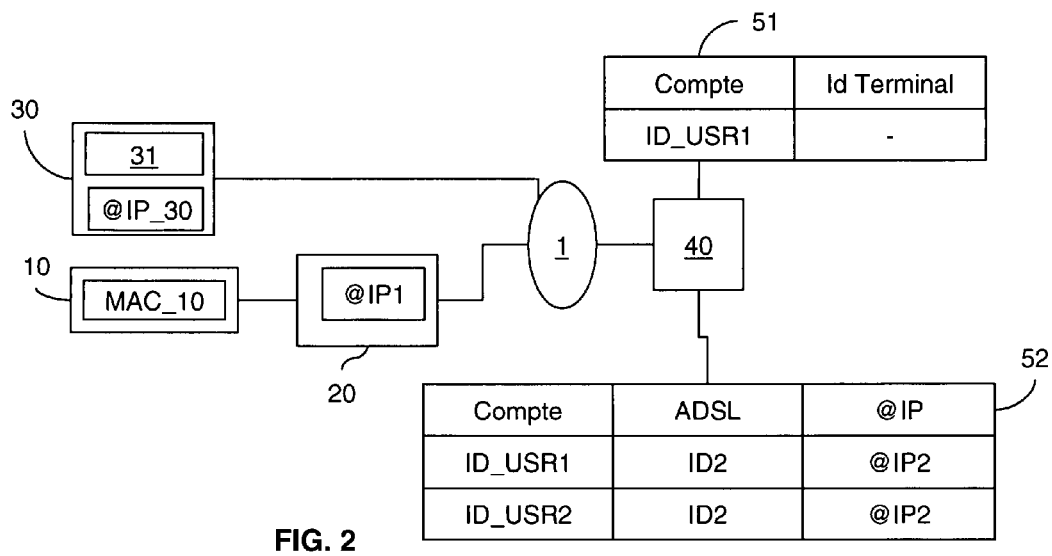
FIG. 2 shows an association device in accordance with the invention in a second environment.

FIG. 2 shows the association device 40 of FIG. 1 in a second environment.

In this example, it is assumed that the personal computer 30 is connected directly to the Internet 1.

In FIG. 6, reference R3 designates the access request received by the association device 40 during step E10, following the request made by the user of the personal computer 30 to access the account of identifier ID_USR1.

In this example, the source address @S of the access request R1 is the address @IP_30 of the computer.

In the example described herein, the gateway 20 is connected to the Internet 1 by an ADSL line having an ADSL identifier referenced ID2.

The association method of the invention implemented by the association device 40 takes place as before, and the association device 40 receives, during above-described step E30, the association request R2 containing the address @IP1 of the gateway 20 to which the terminal 10 for association is connected, and the identifier MAC_10 of said terminal.

In this example, during test E50, the association device 40 detects that the gateway address @IP1 of the association request R2 is different from the source address of the access request R1.

Consequently, the result of the test E50 is negative. This test is followed by a step E70 during which the processor 41 of the association device 40 obtained a second gateway address @IP2 from the above-mentioned source address.

In the example described herein, this search is performed in a database 52 that includes:
the user account identifiers;
the ADSL line identifiers; and
the gateway addresses associated with said ADSL identifiers.

In this example, the association device 40 thus begins by obtaining the ADSL identifier ID2 associated with the account identifier ID_USR1, and then from said ADSL identifier, the address @IP2 associated with the ADSL identifier ID2.

During a step E70, the association device 40 thus allocates the address @IP1 to the second gateway address @IP2.

This allocation step E70 is followed by the above-described test E80.

During the test E80, the association device 40 detects that the two gateway addresses, i.e. the first address @IP1 obtained in the association request R2 and the second address @IP2 obtained in the database 52, are identical.

This test E80 is followed by the above-described test E90, during which the association device 40 associates the unique identifier MAC_10 of the terminal 10 with the account identifier ID_USR1 in the database 51, as shown in FIG. 7.

Detailed Description of a Second Embodiment

Figure 4:
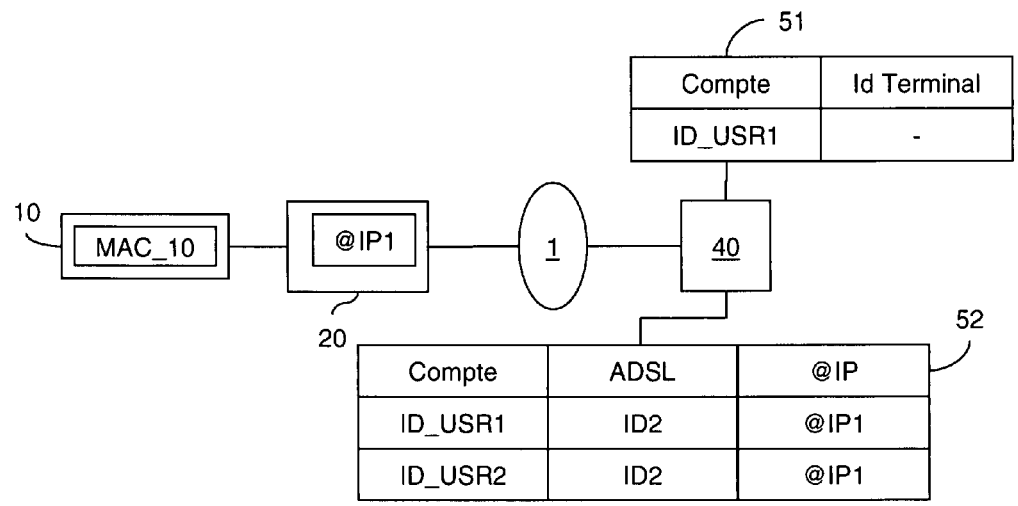
FIG. 4 shows an association device in accordance with the invention in a third environment.

FIG. 4 shows an association device 40 in accordance with the invention in a third environment.

Figure 5:
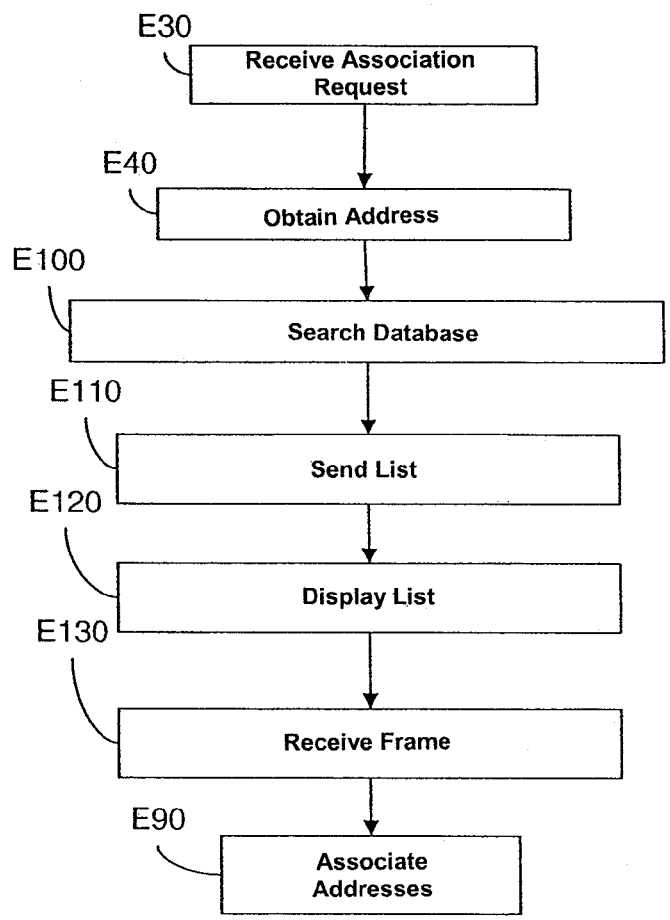
FIG. 5 shows, in the form of a flow chart, the main steps of an association method in accordance with the invention in a second implementation that applies to this third environment.

In this example, the read-only memory 43 of the device 40 stores a computer program in accordance with the invention and comprising main steps as shown with reference to FIG. 5.

In this implementation of the invention, the user does not have a personal computer 30.

It is assumed that during a step E30, the association device 40 receives an association request R2 issued by the terminal 10.

During a step that is not referenced, the association device 40 verifies in the database 51 whether the account identifier is associated with the unique identifier MAC_10 of the terminal 10 as received in the association device R2.

Since it is not associated in that way, this test is followed by a step E40 during which the association device 40 obtains, from within the association request R2, the address @IP1 of the gateway behind which the terminal 10 is connected.

Then, during a step E100, the association device 40 in accordance with the invention searches in the database 52 for the account identifiers associated with said address @IP1.

More precisely, this operation is performed by initially obtaining the identifier ID2 of the ADSL line associated with the address SIP1 of the gateway 20, followed by the account identifiers associated with said ADSL identifier ID2.

In the example described herein, two unique account identifiers are detected, i.e. the identifiers ID_USR1 and ID_USR2.

This is explained by the fact that two different users possess accounts on the service platform 60 even if they gain access thereto through the same gateway 20.

During a step E110, the association device 40 sends a list L comprising these two account identifiers ID_USR1 and ID_USR2 to the terminal 10.

It is assumed that these account identifiers are displayed on a screen of the terminal 10 and that during a step E120, the user selects the identifier ID_USR1.

This account identifier ID_USR1 is returned by the terminal 10 in a frame T3 shown in FIG. 6.

In the example shown, the frame T3 includes the address @IP1 of the gateway 20, the unique identifier MAC_10 of the terminal 10, and also the account identifier ID_USR1.

In an alternative, the frame T3 could include solely the address @IP1 of the gateway 20 together with the account identifier ID_USR1.

This frame T3 is received by the association device 40 during a step E130.

Then, during a step E90, the association device 40 associates the unique identifier MAC_10 of the terminal 10 in the database 51 with the unique account identifier ID_USR1 as received in the frame T3 in the preceding step.

The resulting state of the database 51 is shown in FIG. 7.

What is claimed is:

1. A method for associating a first terminal connected to a telecommunications network via a gateway with an account of a user, the method comprising:
receiving an access request issued by a second terminal for connecting to a user account to access a service platform available on the telecommunications network, said access request including a source address for substitution by said gateway;
obtaining said source address and a unique identifier of the user account from said received access request;
receiving an association request issued by a first terminal;
obtaining a first gateway address of said gateway in the telecommunications network and a unique identifier of the first terminal from said association request issued by said first terminal;
obtaining a second gateway address from at least said source address; and
comparing said first and second gateway addresses and, if said first and second gateway addresses are equal, associating the unique identifier of the first terminal with the unique identifier of the account of the user.

2. The association method according to claim 1, wherein:
if said second terminal is connected to said telecommunications network via said gateway, said second gateway address is constituted by said source address; otherwise said second gateway address is obtained from a database in which said second gateway address is associated with said unique identifier of the user account.

3. The association method according to claim 1, wherein, in order to obtain said second gateway address, the method further comprises:
obtaining, from a database, an identifier of a telecommunications line associated with said unique identifier of the user account; and
obtaining, from the database, said second gateway address associated with said identifier of the telecommunications line.

4. The method of claim 1, wherein said step of obtaining a second gateway address comprises:
obtaining the second gateway address from the source address, the first gateway address, the unique identifier of the account of the user and a database accessible by a processor of a service platform in which gateway addresses are associated with unique identifiers of accounts of users.

5. A device for associating a first terminal connected to a telecommunications network via a gateway with an account of a user, said device comprising:
- a receiver configured to receive an access request issued by a second terminal for connecting to a user account to access a service platform available on the telecommunications network, said access request including a source address for substitution by said gateway, the receiver being further configured to obtain said source address and a unique identifier of the user account from said received access request, to receive an association request issued by a first terminal, to obtain a first gateway address of said gateway in the telecommunications network and a unique identifier of the first terminal from said association request issued by said first terminal and to obtain a second gateway address from at least said source address; and
- a processor configured to compare said first and second gateway addresses and, if said first and second gateway addresses are equal, associate the unique identifier of said first terminal with said unique identifier of the account of the user.

6. A service platform comprising a device according to claim 5 for associating, in a database, the unique identifier of the first terminal with the unique identifier of the account of the user of said first terminal on said platform.

7. A non-transitory recording medium encoded with a computer program executed by a computer that causes association of a first terminal connected to a telecommunications network via a gateway with an account of a user, the computer program comprising:
- program code for receiving an access request issued by a second terminal for connecting to said user account to access a service platform available on the telecommunications network, said access request including a source address for substitution by said gateway;
- program code for obtaining said source address and said a unique identifier of the user account from said received access request;
- program code for receiving an association request issued by a first terminal;
- program code for obtaining a first gateway address of said gateway in the telecommunications network and a unique identifier of the first terminal from said association request issued by said first terminal;
- program code for obtaining a second gateway address from at least said source address; and
- program code for comparing said first and second gateway addresses and, if said first and second gateway addresses are equal, for associating the unique identifier of the first terminal with the unique identifier of the account of the user.

8. A terminal having a device configured to connect to a telecommunications network via a gateway, said terminal comprising a unique identifier and a first device configured to send an association request including said unique identifier and an address of the gateway in the telecommunications network to a further device configured to associate said terminal with an account of a user, after having received an invitation sent by said further device to associate said terminal with a unique identifier of the account of the user.

9. The terminal according to claim 8, further comprising:
- a button for triggering the sending of said association request.

* * * * *